United States Patent
Fujiki et al.

(10) Patent No.: US 11,825,224 B2
(45) Date of Patent: Nov. 21, 2023

(54) VIDEO SIGNAL RECEIVER AND VIDEO SIGNAL TRANSMISSION AND RECEPTION SYSTEM

(71) Applicant: THINE ELECTRONICS, INC., Tokyo (JP)

(72) Inventors: Rei Fujiki, Tokyo (JP); Daisuke Iwama, Tokyo (JP)

(73) Assignee: THINE ELECTRONICS, INC., Tokyo (JP)

( * ) Notice: Subject to any disclaimer, the term of this patent is extended or adjusted under 35 U.S.C. 154(b) by 287 days.

(21) Appl. No.: 16/245,493

(22) Filed: Jan. 11, 2019

(65) Prior Publication Data

US 2019/0222790 A1    Jul. 18, 2019

(51) Int. Cl.
  *H04N 5/38*  (2006.01)
  *H04N 7/18*  (2006.01)
  (Continued)

(52) U.S. Cl.
  CPC .............. *H04N 25/745* (2023.01); *H04N 5/38* (2013.01); *H04N 5/44* (2013.01); *H04N 5/77* (2013.01); *H04N 7/181* (2013.01); *H04N 21/426* (2013.01)

(58) Field of Classification Search
  CPC ...... H04N 21/426; H04N 5/3765; H04N 5/38; H04N 5/44; H04N 5/4401; H04N 5/77; H04N 7/181
  See application file for complete search history.

(56) References Cited

U.S. PATENT DOCUMENTS 4,860,101 A    8/1989  Pshtissky et al.
6,008,867 A *  12/1999  Cooper ................. H04N 7/181
                                                      348/159
(Continued)

FOREIGN PATENT DOCUMENTS

CN    1228900 A    9/1999
CN    1642231 A    7/2005
(Continued)

OTHER PUBLICATIONS

""Deep learning seminar" introducing the front lines of NVIDIA, automatic driving and automatic recognition Announcing improvement of pedestrian detection accuracy by heterogeneous learning", Internet URL:https://car.watch.impress.co.jp/docs/topics/717652.html, Aug. 26, 2015 (57 pages).
(Continued)

*Primary Examiner* — Derrick W Ferris
*Assistant Examiner* — M Mostazir Rahman
(74) *Attorney, Agent, or Firm* — Sughrue Mion, PLLC (57) ABSTRACT

A video signal receiver includes a clock signal receiver, a frame signal generator, and a frame signal transmitter. The clock signal receiver receives a camera video signal clock sent from a video signal transmitter in a camera module and outputs the clock to the frame signal generator. The frame signal generator generates a frame signal based on the clock received by the clock signal receiver and outputs the frame signal to the frame signal transmitter. The frame signal transmitter receives input of the frame signal output from the frame signal generator and sends the frame signal to the video signal transmitter of each camera module.

7 Claims, 8 Drawing Sheets

(51) Int. Cl.
*H04N 25/71* (2023.01)
*H04N 5/77* (2006.01)
*H04N 5/44* (2011.01)
*H04N 21/426* (2011.01)

(56) References Cited

U.S. PATENT DOCUMENTS

| | | | |
|---|---|---|---|
| 2006/0238826 A1* | 10/2006 | Itou | H04N 7/181 348/E7.086 |
| 2010/0026814 A1* | 2/2010 | Shimoda | H04N 5/23241 348/207.1 |
| 2010/0071010 A1* | 3/2010 | Elnathan | H04N 5/06 725/81 |
| 2010/0098161 A1* | 4/2010 | Mizoguchi | H04N 21/4347 375/E7.243 |
| 2011/0234800 A1 | 9/2011 | Terasaki | |
| 2012/0287341 A1* | 11/2012 | Choi | H04N 5/262 348/E5.104 |
| 2013/0050176 A1* | 2/2013 | Kim | G09G 5/18 345/214 |
| 2015/0213838 A1* | 7/2015 | Dinev | G11B 27/10 386/224 |
| 2016/0352388 A1* | 12/2016 | Lane | H04B 1/3822 |
| 2018/0176424 A1* | 6/2018 | Christl | H04N 7/181 |
| 2018/0313928 A1* | 11/2018 | Jones | G01S 5/00 |
| 2019/0158721 A1* | 5/2019 | Ceekala | H04N 5/247 |
| 2019/0222795 A1 | 7/2019 | Fujiki et al. | |
| 2019/0222796 A1 | 7/2019 | Fujiki et al. | |
| 2020/0177947 A1* | 6/2020 | Hui | H04L 65/65 |

FOREIGN PATENT DOCUMENTS

| | | |
|---|---|---|
| CN | 101379815 A | 3/2009 |
| CN | 107305405 A | 10/2017 |
| JP | 6-54329 U | 7/1994 |
| JP | 8-16943 A | 1/1996 |
| JP | 9-37141 A | 2/1997 |
| JP | 10-155132 A | 6/1998 |
| JP | 11-317908 A | 11/1999 |
| JP | 2001-202069 A | 7/2001 |
| JP | 2001-326627 A | 11/2001 |
| JP | 2007-49218 A | 2/2007 |
| JP | 2007-281550 A | 10/2007 |
| WO | 2017/001069 A1 | 1/2017 |

OTHER PUBLICATIONS

"Image Sensing Products", Internet URL:https://www.sony.co.jp/Products/ISP/interview/vol01.html, , searchedon Dec. 11, 2017 (15 pages).

"Board setting method for camera connection (external trigger)External trigger synchronized imaging with AIPTool!", InternetURL:http://www.avaldata.co.jp/solution_imaging/cameralink_tips/aiptool_ex_trg.html, Searched on Dec. 11, 2017 (21 pages).

"New MotorVuTM 360 reference design enables four-channel HD surround view and recording", Internet URL:https://www.ambarella.com/news/48/122/Ambarella-Unveils-HD-360-View-Automotive-Camera-Solution, searched on Dec. 11, 2017 (4 pages).

"B5 Video Serializer/De-Serializer Companion Chips", Internet URL:https://www.ambarella.com/uploads/docs/MotorVu-360-product-brief.pdf, searched on Dec. 25, 2017 (2 pages).

U.S. Appl. No. 16/245,460, filed Jan. 11, 2019 (Fujiki et al.).
U.S. Appl. No. 16/245,528, filed Jan. 11, 2019 (Fujiki et al.).

* cited by examiner

Fig. 6A CONTROL OF GENERATED FRAME SIGNAL

Fig. 6B  Noise event

Fig. 6C INTERNAL OSCILLATOR clock

Fig. 6D FRAME SIGNAL GENERATED BY CAMERA VIDEO SIGNAL RECEPTION IC by INTERNAL OSCILLATOR clock AS REFERENCE Fig. 6E CAMERA VIDEO SIGNAL clock Fig. 6F FRAME SIGNAL GENERATED BY CAMERA VIDEO SIGNAL RECEPTION IC by CAMERA VIDEO SIGNAL clock AS REFERENCE

VIDEO SIGNAL RECEIVER AND VIDEO SIGNAL TRANSMISSION AND RECEPTION SYSTEM

TECHNICAL FIELD

The present invention relates to a video signal receiver and a video signal transmission and reception system.

BACKGROUND

A technology for analyzing a plurality of videos acquired at the same time using a plurality of cameras has been developed. For example, in an advanced driver assistance system (ADAS) that detects and avoids a possibility of occurrence of an accident or the like in advance, in order to implement automated driving, surrounding environment information such as a vehicle, a pedestrian, and an inter-vehicle distance is extracted from a camera video information by processing video information acquired by multiple cameras mounted in an automobile in real time and applying deep learning technology. A graphic processor unit (GPU) that performs a pattern matching process using deep learning technology has been developed. By using the GPU, for example, a platform that can process 12 channels of camera video signals can be configured (Non-Patent Document 1).

In such a system, it is important that multiple cameras acquire videos substantially at the same time. For example, in a case where it is assumed that a plurality of cameras mounted in an automobile legally traveling at a speed of 250 km/h on Autobahn in Germany acquire information related to a surrounding environment at a frame rate of 30 frames per second (fps) without synchronizing with each other, a maximum 16.7 ms of difference in capturing time is present among the plurality of cameras, and a spatial position captured by each camera varies by maximum 1.2 m approximately. In order to extract the surrounding environment information after dealing with such a difference in video acquisition time, an additional process that is different from an original surrounding environment information extraction process is needed.

Accordingly, it is important that each camera acquires a video substantially at the same time. For example, in a case where the automobile is traveling at a speed of 250 km/h, and each camera acquires a video at a difference in time of less than or equal to 150 μs, a difference in spatial position captured by each camera is 10 mm, and the additional process is not needed.

In general, not only a lens system and an image sensor (for example, a CMOS image sensor) but also an oscillator that drives the image sensor by supplying a clock to the image sensor are arranged inside a camera module. However, oscillation characteristics of the oscillator have individual differences. In a case where a capturing timing is generated in each of a plurality of camera modules using a clock output from an incorporated oscillator as a reference, capturing operations of the plurality of camera modules cannot be in synchronization.

In a case where a common clock is supplied to the plurality of camera modules from an external oscillator, the capturing timings of the plurality of camera modules can be set to be substantially the same (Non-Patent Document 2). However, in the case of mounting in the automobile, a clock supply line longer than 10 m may be needed between the external oscillator and the camera module. The weight of the clock supply line causes the fuel efficiency of the automobile to deteriorate. In addition, the clock supply line having a long distance acts as an antenna and causes radiation of an unnecessary electromagnetic wave. Accordingly, it is not preferable to supply the common clock to the plurality of camera modules from the external oscillator.

The capturing timings of the plurality of camera modules can also be set to be substantially the same by supplying a common capturing start timing instruction signal to the plurality of camera modules from the outside instead of the common clock (Non-Patent Document 3). Generally, the camera module has a function of starting capturing by receiving the capturing start timing instruction signal. After capturing is started, the camera module operates based on the clock output from the incorporated oscillator. Thus, a difference of one frame is present in capturing end time. However, by periodically repeating the supply of the common capturing start timing instruction signal to the plurality of camera modules again before the difference leads to a significant problem, the difference in operation timing among the plurality of camera modules can be set to be less than or equal to a difference of a certain constant time.

A frame signal that represents the capturing start timing in each frame is used as the capturing start timing instruction signal periodically supplied to the plurality of camera modules in common. In the case of a frame rate of 30 fps, the frame signal is supplied at an interval of approximately 33 ms. A deviation of an oscillation frequency of the oscillator incorporated in the camera module is generally 100 ppm. In this case, while the difference in operation timing that is present among the plurality of camera modules in a period (33 ms) of one frame from the timing of a certain frame signal until the timing of the subsequent frame signal is maximum 3.3 μs, such a difference is less than the above allowance value (150 μs).

A signal line for supplying the common frame signal to the plurality of camera modules may be longer than 10 m in the same manner as the case of the above clock supply line. While a central operation processor can generate the frame signal, the central operation processor and the image sensor generally do not have a capability of transmitting and receiving the video signal and the frame signal through a signal line having a long distance.

Therefore, a video signal transmitter and a video signal receiver having a capability of transmitting and receiving a signal through a signal line having a long distance are used as dedicated interfaces (Non-Patent Document 4 and Non-Patent Document 5). Each of the video signal transmitter and the video signal receiver is configured as a semiconductor integrated circuit. The video signal transmitter constitutes the camera module along with the image sensor and the like. The video signal receiver constitutes a video signal reception module along with the central operation processor.

The video signal transmitter sends the video signal acquired by the image sensor to the video signal receiver. The video signal receiver receives the video signal sent from the video signal transmitter and provides the video signal to the central operation processor. In addition, the video signal receiver sends a control signal such as the frame signal generated by the central operation processor to the video signal transmitter. The video signal transmitter receives the control signal sent from the video signal receiver and provides the frame signal to the image sensor. In each of the video signal transmitter and the video signal receiver, a general-purpose terminal can be used as a terminal for transmitting and receiving the control signal.

(Non-Patent Document 1): (NVIDIA, introducing the forefront of automated driving and automatic identification in "deep learning seminar", announcing improvement and the like in pedestrian detection accuracy using heterogeneous learning, [online], Aug. 26, 2015, Impress Corporation, [searched on Dec. 11, 2017], Internet <URL: https://car.watch.impress.co.jp/docs/topics/717652.html>)

(Non-Patent Document 2): "Image Sensing Products", [online], Sony, [searched on Dec. 11, 2017], Internet <URL: https://www.sony.co.jp/Products/ISP/interview/vol01.html>)

(Non-Patent Document 3): "Board Setting Method for Camera Connection (External Trigger)—External Trigger Synchronized Capturing Using AIPTool!, [online], AVAL DATA CORPORATION, [searched on Dec. 11, 2017], Internet <URL: http://www.avaldata.co.jp/solution_imaging/cameralink_tips/aiptool_ex_trg.html>)

(Non-Patent Document 4): "New MotorVu™ 360 reference design enables four-channel HD surround view and recording", [online], Ambarella, [searched on Dec. 11, 2017], Internet <URL: https://www.ambarella.com/news/48/122/Ambarella-Unveils-HD-360-V iew-Automotive-Camera-Solution>

(Non-Patent Document 5): "B5 Video Serializer/De-Serializer Companion Chips", [online], Ambarella, [searched on Dec. 25, 2017], Internet <URL: https://www.ambarella.com/uploads/docs/MotorVu-360-product-brief.p df>)

SUMMARY

However, a configuration in which the frame signal generated by the central operation processor is sent to the image sensor through the video signal receiver and the video signal transmitter has the following problem. That is, in the central operation processor that has to perform various processes, it is not easy to perform a process of generating the frame signal at a temporally high accuracy timing and sending the frame signal from the general-purpose terminal. In addition, even in a case where the process of generating and sending the frame signal can be performed in the central operation processor, the frame signal sending process may adversely affect other important processes due to limitations on a processing capability.

In order to resolve such a problem, it is considered that the frame signal is generated in the video signal receiver instead of generating the frame signal in the central operation processor. In a case where the frame signal is generated in the video signal receiver; the throughput of the central operation processor is reduced.

A configuration in which the frame signal generated in the video signal receiver is sent to the image sensor through the video signal transmitter has the following problem. That is, an oscillator that supplies a clock as a reference for generating the frame signal in the video signal receiver is needed. In a case where the oscillator is disposed outside the video signal receiver, the oscillator, generally, can output the clock at an accurate cycle but has an expensive configuration. Conversely, in a case where the oscillator is disposed inside the video signal receiver, the oscillator generally can have an inexpensive configuration. However, the clock cycle of the oscillator varies by greater than or equal to ±10% and thus, may not be allowed in terms of manufacturing quality.

The invention is conceived based on the result of the inventor's review in order to resolve the above problem. An object of the invention is to provide a video signal receiver that can generate a frame signal at a high accuracy timing and can have an inexpensive configuration, and a video signal transmission and reception system that includes such a video signal receiver and a video signal transmitter.

A video signal receiver of the invention is connected through a signal line to a video signal transmitter sending a video signal acquired by capturing by a camera and receives the video signal sent from each video signal transmitter. The video signal receiver includes a clock signal receiver that receives a clock sent from the video signal transmitter, a frame signal generator that generates and outputs a frame signal based on the clock received by the clock signal receiver, and a frame signal transmitter that sends the frame signal output from the frame signal generator to the video signal transmitter.

It is preferable that the video signal receiver of the invention further includes an internal oscillator that generates a clock, and a detection unit that detects whether or not the reception of the clock by the clock signal receiver is normal. In this case, it is preferable that the frame signal generator outputs the frame signal generated based on the clock received by the clock signal receiver in a case where the detection unit detects normal reception of the clock by the clock signal receiver, and outputs the frame signal generated based on the clock generated by the internal oscillator in a case where the detection unit detects abnormal reception of the clock by the clock signal receiver.

In the video signal receiver of the invention, it is preferable that the frame signal generator includes (1) a first generator that generates the frame signal based on the clock received by the clock signal receiver, (2) a second generator that generates the frame signal based on the clock generated by the internal oscillator, and (3) a signal selection unit that selects and outputs the frame signal generated by the first generator in a case where the detection unit detects normal reception of the clock by the clock signal receiver, and selects and outputs the frame signal generated by the second generator in a case where the detection unit detects abnormal reception of the clock by the clock signal receiver.

In the video signal receiver of the invention, it is preferable that the frame signal generator includes (1) a clock selection unit that selects and outputs the clock received by the clock signal receiver in a case where the detection unit detects normal reception of the clock by the clock signal receiver, and selects and outputs the clock generated by the internal oscillator in a case where the detection unit detects abnormal reception of the clock by the clock signal receiver, and (2) a generator that generates and outputs the frame signal based on the clock output from the clock selection unit.

In the video signal receiver of the invention, it is preferable that the frame signal generator outputs the frame signal generated based on the clock generated by the internal oscillator depending on a detection result of the detection unit indicating abnormal reception of the clock by the clock signal receiver at a time of start-up, and outputs the frame signal generated based on the clock received by the clock signal receiver in a case where the detection unit subsequently detects a change from abnormal to normal reception of the clock by the clock signal receiver.

In the video signal receiver of the invention, it is preferable that the frame signal generator outputs the frame signal generated based on the clock generated by the internal oscillator in a case where the detection unit detects a change from normal to abnormal reception of the clock by the clock signal receiver, and outputs the frame signal generated based on the clock received by the clock signal receiver in a case where the detection unit detects a change from abnormal to normal reception of the clock by the clock signal receiver.

In the video signal receiver of the invention, it is preferable that a plurality of the clock signal receivers are provided, the video signal receiver further includes a detection unit that detects whether or not reception of the clock by each of the plurality of clock signal receivers is normal, and in a case where the detection unit detects normal reception of the clock by any clock signal receiver among the plurality of clock signal receivers, the frame signal generator outputs the frame signal generated based on the clock received by the clock signal receiver for which the normal reception of the clock is detected.

A video signal transmitter of the invention may send a dummy video signal instead of a video signal acquired by capturing by a camera in a case where the video signal is not present. The video signal transmitter may not send the dummy video signal in a case where the video signal acquired by capturing by the camera is not present.

A video signal transmission and reception system of the invention includes a video signal transmitter that sends a video signal acquired by capturing by a camera, and the video signal receiver of the invention that receives the video signal sent from the video signal transmitter and sends a frame signal, in which the video signal transmitter receives the frame signal sent from the video signal receiver and outputs the frame signal to a corresponding camera.

The video signal receiver of the invention can generate the frame signal at a high accuracy timing and can have an inexpensive configuration.

DETAILED DESCRIPTION

Hereinafter, an embodiment of the invention will be described in detail with reference to the appended drawings. The same elements in the description of the drawings will be designated by the same reference signs, and duplicate descriptions of such elements will not be repeated. It is intended that the invention is not limited to those illustrations and is shown by the claims and includes all changes made within the equivalent meaning and scope of the claims.

Figure 1:
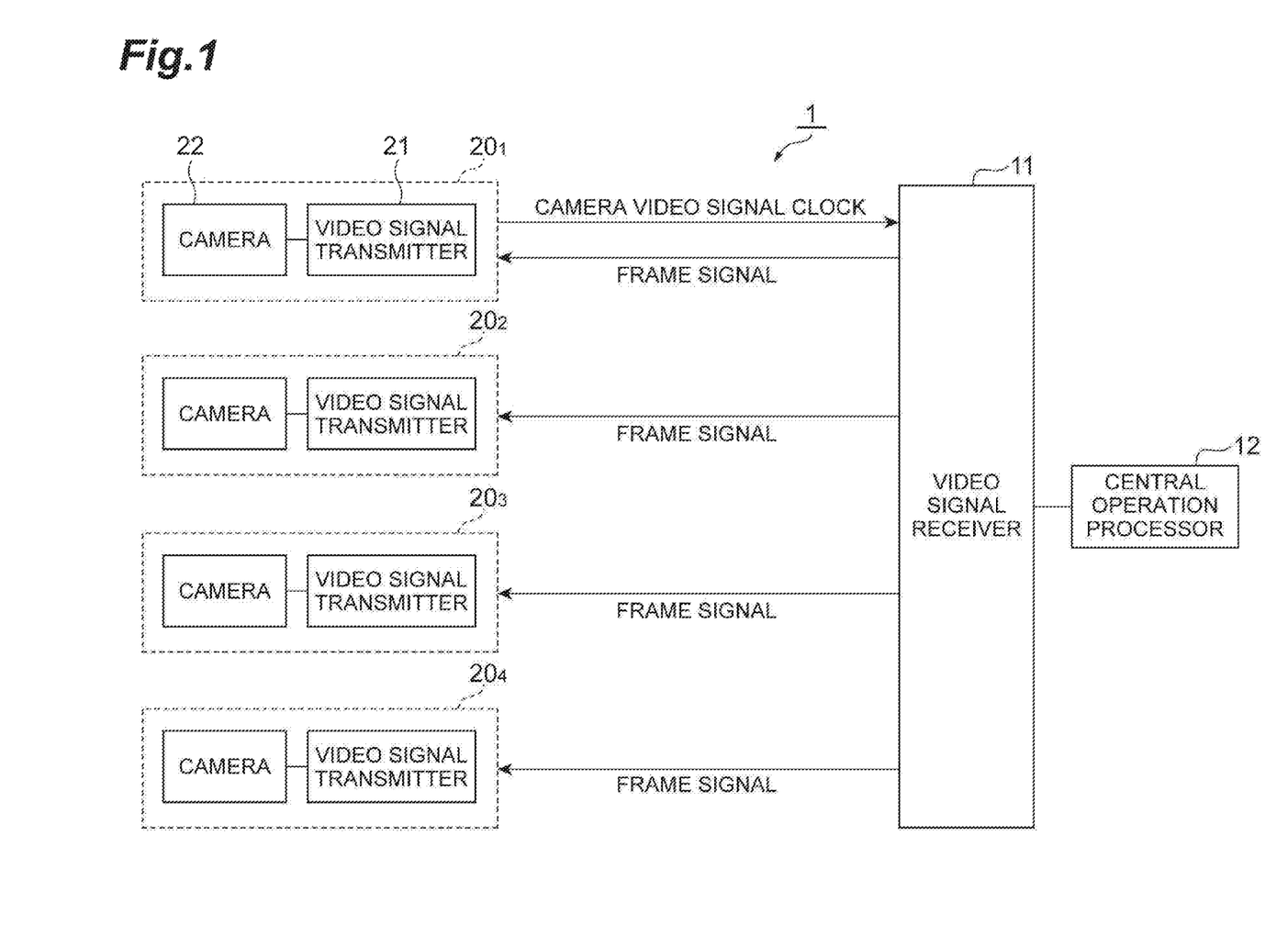
FIG. 1 is a diagram illustrating a configuration of a video signal transmission and reception system 1.

FIG. 1 is a diagram illustrating a configuration of a video signal transmission and reception system 1. The video signal transmission and reception system 1 includes a video signal receiver 11 and a plurality of video signal transmitters 21. Each of camera modules $20_1$ to $20_4$ includes the video signal transmitter 21 and a camera 22. While four camera modules are illustrated in FIG. 1, the number of camera modules is not limited. For example, in a case where the video signal transmission and reception system 1 is mounted in an automobile, the video signal receiver 11 and the video signal transmitter 21 are connected through a signal line having a long distance (for example, a length of greater than or equal to 10 m), and transmission and reception of a signal can be performed at such a long distance.

The camera 22 includes a lens system and an image sensor (for example, a CMOS image sensor) and also includes an oscillator that drives the image sensor by supplying a clock to the image sensor. In each camera module $20_n$, the video signal transmitter 21 receives a frame signal sent from the video signal receiver 11 and provides the frame signal to the camera 22. In a case where the frame signal is supplied from the video signal transmitter 21, the camera 22 performs capturing and outputs a video signal acquired by capturing to the video signal transmitter 21. The video signal transmitter 21 receives the video signal acquired by capturing by the camera 22 from the camera 22 and sends the video signal to the video signal receiver 11.

In the camera module $20_1$ among the camera modules $20_1$ to $20_4$, the video signal transmitter 21 sends a camera, video signal clock to the video signal receiver 11. In addition, in the camera module $20_1$, in a case where the video signal acquired by capturing by the camera 22 is not present, the video signal transmitter 21 may send a dummy video signal to the video signal receiver 11 instead of the video signal. The video signal transmitter 21 may not send the dummy video signal in a case where the video signal acquired by capturing by the camera 22 is not present.

The video signal receiver 11 sends the frame signal to each camera module $20_n$, and receives the video signal sent from each camera module $20_n$. The video signal receiver 11 outputs the received video signal to a central operation processor 12. The central operation processor 12 performs a necessary process based on the video signal received from the video signal receiver 11.

The video signal receiver 11 receives the camera video signal clock sent from the video signal transmitter 21 in the camera module $20_1$. The video signal receiver 11 generates the frame signal based on the camera video signal clock and sends the frame signal to each camera module $20_n$. In addition, in a case where the dummy video signal is sent from the video signal transmitter 21 in the camera module $20_1$, the video signal receiver 11 receives the dummy signal. While a case where the frame signal is generated based on only the camera video signal clock is described in the embodiment, the video signal receiver 11 may also be configured to include a circuit that generates the frame signal based on an internal oscillator clock.

Figure 2:
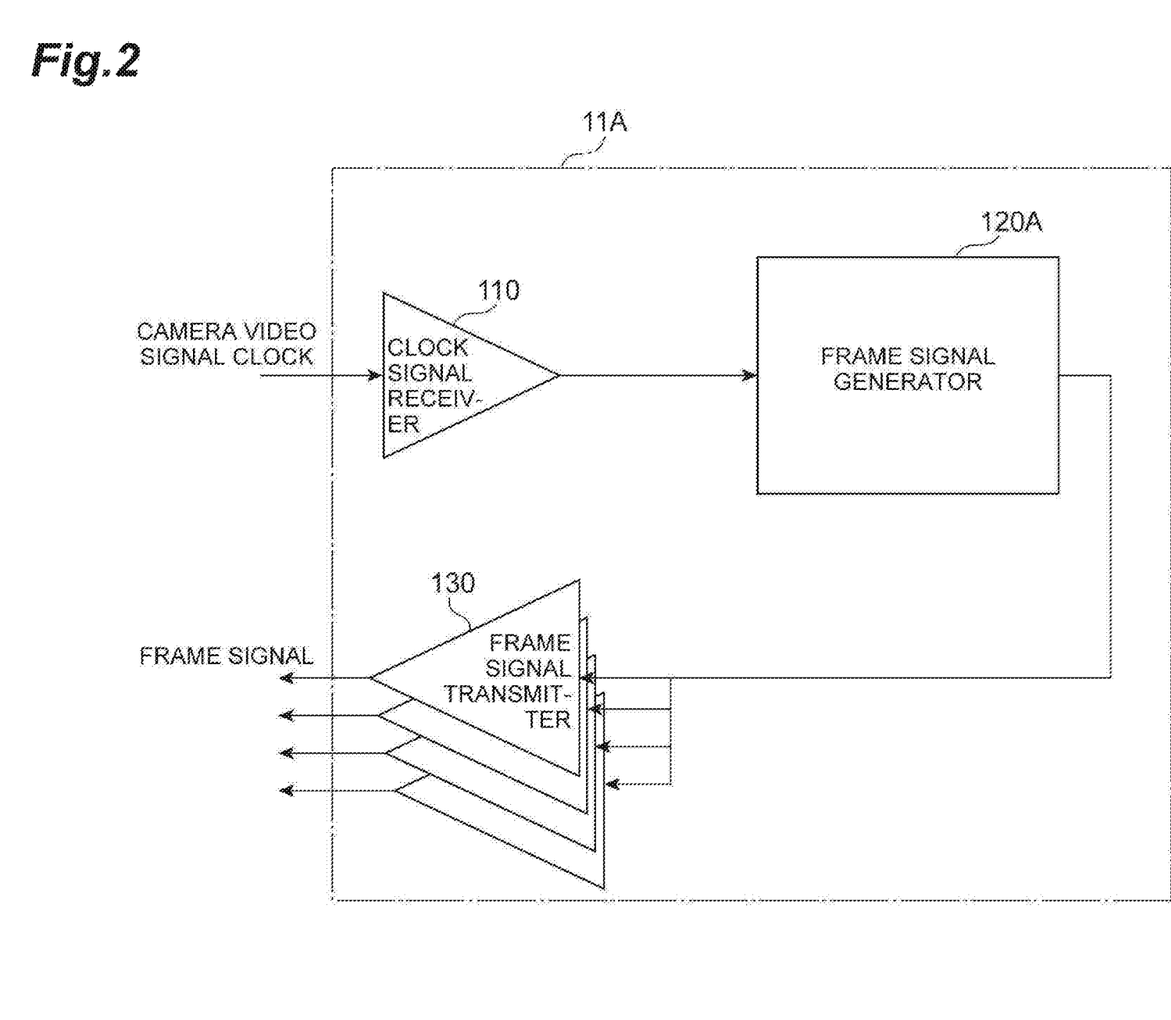
FIG. 2 is a diagram illustrating a first configuration example of a video signal receiver 11.

FIG. 2 is a diagram illustrating a first configuration example of the video signal receiver 11. FIG. 2 illustrates a configuration related to the generation of the frame signal. A video signal receiver 11A of the first configuration example includes a clock signal receiver 110, a frame signal generator 120A, and a frame signal transmitter 130.

The clock signal receiver 110 receives the camera video signal clock sent from the video signal transmitter 21 in the camera module $20_1$ and outputs the clock to the frame signal generator 120A. The frame signal generator 120A generates the frame signal based on the clock received by the clock signal receiver 110 and outputs the frame signal to the frame signal transmitter 130. The frame signal transmitter 130 receives input of the frame signal output from the frame signal generator 120A and sends the frame signal to the video signal transmitter of each camera module $20_n$.

The video signal receiver 11A having the above configuration can generate the frame signal at a high accuracy timing based on the camera video signal clock. In addition, since an external oscillator does not need to be used, the video signal receiver 11A can have an inexpensive configuration.

The frame signal is not supplied to each camera module $20_n$ from the video signal receiver 11 immediately after power-up and start-up. Thus, the camera video signal clock is not sent from the video signal transmitter 21 in the camera module $20_1$. Accordingly, the video signal receiver 11 may not be able to generate the frame signal. In such a case, the camera 22 in each camera module $20_n$ may not be able to start a capturing operation.

Therefore, the video signal receiver 11 in the camera module $20_1$ preferably sends the dummy video signal and the clock instead of the video signal in a case where the video signal acquired by capturing by the camera 22 is not present. The video signal receiver 11 that receives the dummy video signal and the clock can generate the frame signal based on the clock and send the frame signal to the video signal transmitter 21 of each camera module $20_n$. Then, the camera video signal clock is sent from the video signal transmitter 21 of the camera module $20_1$. Thus, the video signal receiver 11 can generate and send the frame signal based on the clock received by the clock signal receiver 110.

In addition, a second configuration example (FIG. 3) or a third configuration example (FIG. 4) described below is preferred as the video signal receiver 11. By having such a configuration, the video signal receiver 11 can preferably operate (FIGS. 5A to 5F and FIGS. 6A to 6F) at each time of start-up, occurrence of an abnormal state, and return to a normal state.

Figure 3:
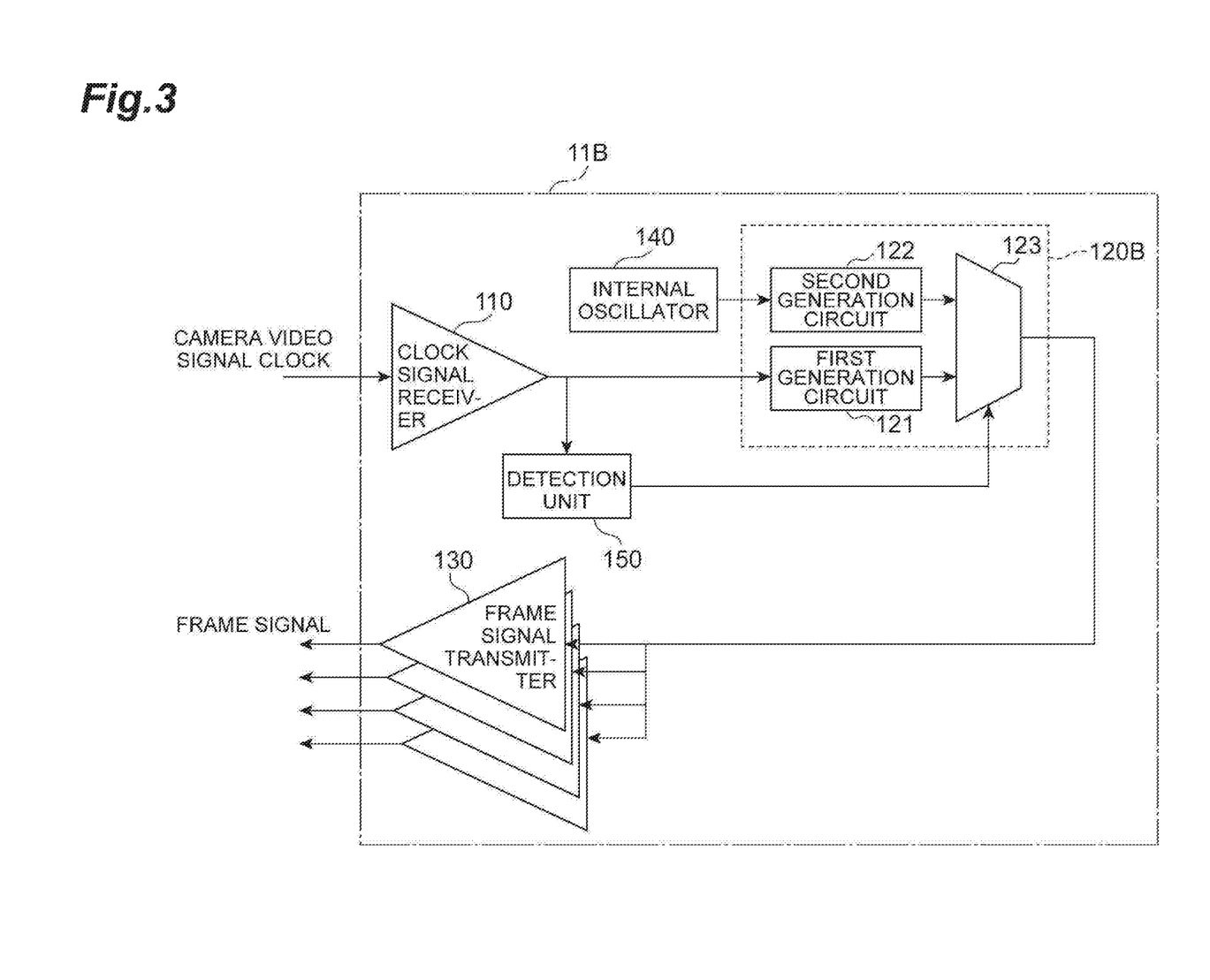
FIG. 3 is a diagram illustrating a second configuration example of the video signal receiver 11.

FIG. 3 is a diagram illustrating the second configuration example of the video signal receiver 11. FIG. 3 also illustrates a configuration related to the generation of the frame signal. A video signal receiver 11B of the second configuration example includes the clock signal receiver 110, a frame signal generator 120B, the frame signal transmitter 130, an internal oscillator 140, and a detection unit 150.

The video signal receiver 11B of the second configuration example illustrated in FIG. 3 is different from the video signal receiver 11A of the first configuration example illustrated in FIG. 2 in that the video signal receiver 11B includes the frame signal generator 120B instead of the frame signal generator 120A and further includes the internal oscillator 140 and the detection unit 150.

The frame signal generator 120B generates and outputs the frame signal based on the clock received by the clock signal receiver 110. In addition, the frame signal generator 120B can output the frame signal that is generated based on a clock generated by the internal oscillator 140.

The detection unit 150 detects whether or not reception of the clock by the clock signal receiver 110 is normal. In a case where the detection unit 150 detects normal reception of the clock by the clock signal receiver 110, the frame signal generator 120B outputs the frame signal generated based on the clock received by the clock signal receiver 110. In a case where the detection unit 150 detects abnormal reception of the clock by the clock signal receiver 110, the frame signal generator 120B outputs the frame signal generated based on the clock generated by the internal oscillator 140.

The frame signal generator 120B includes a first generator 121, a second generator 122, and a signal selection unit 123. The first generator 121 generates the frame signal based on the clock received by the clock signal receiver 110. The second generator 122 generates the frame signal based on the clock generated by the internal oscillator 140. In a case where the detection unit 150 detects normal reception of the clock by the clock signal receiver 110, the signal selection unit 123 selects the frame signal generated by the first generator 121 and outputs the frame signal to the frame signal transmitter 130. In a case where the detection unit 150 detects abnormal reception of the clock by the clock signal receiver 110, the signal selection unit 123 selects the frame signal generated by the second generator 122 and outputs the frame signal to the frame signal transmitter 130.

Figure 4:
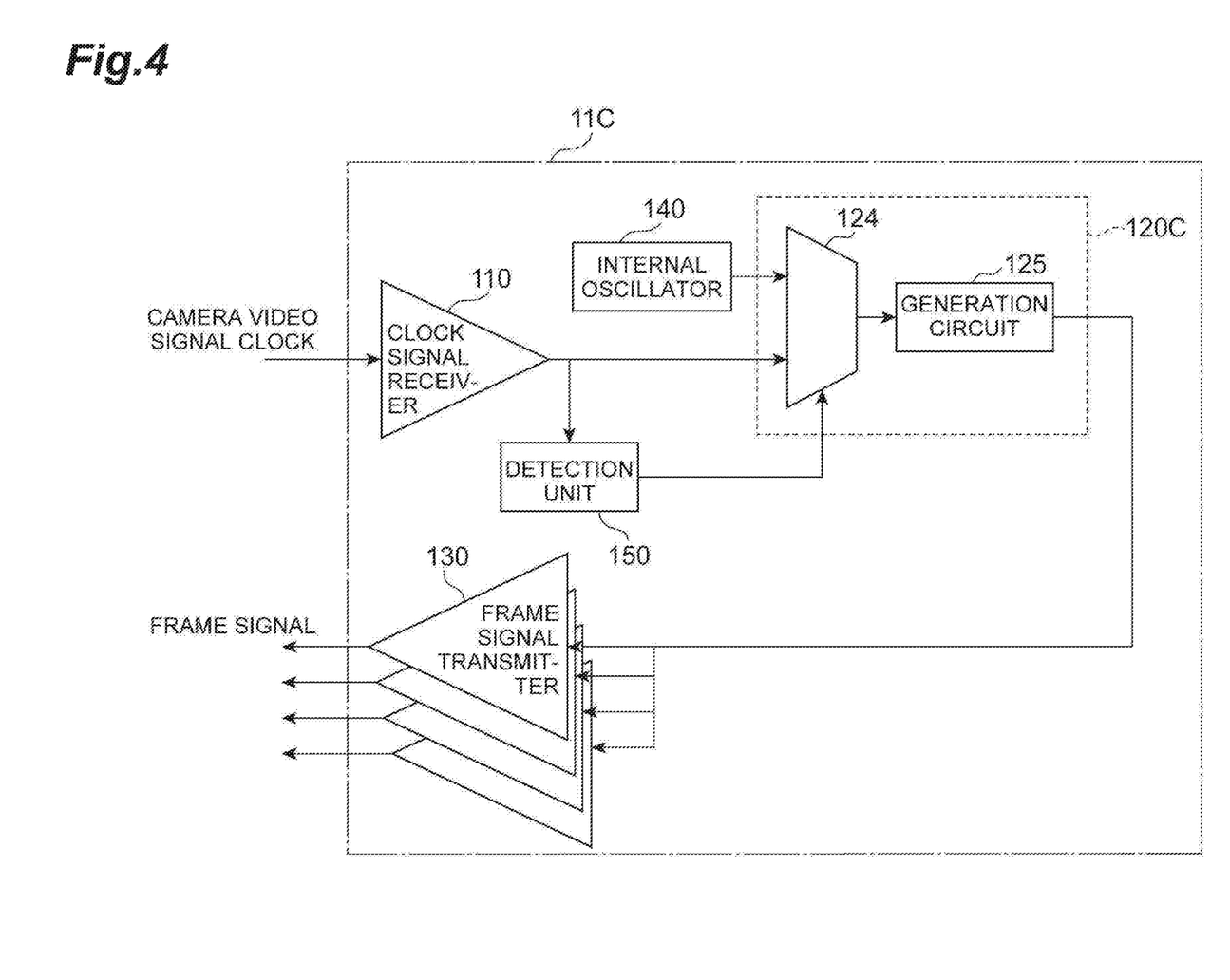
FIG. 4 is a diagram illustrating a third configuration example of the video signal receiver 11.
Figure 5A:
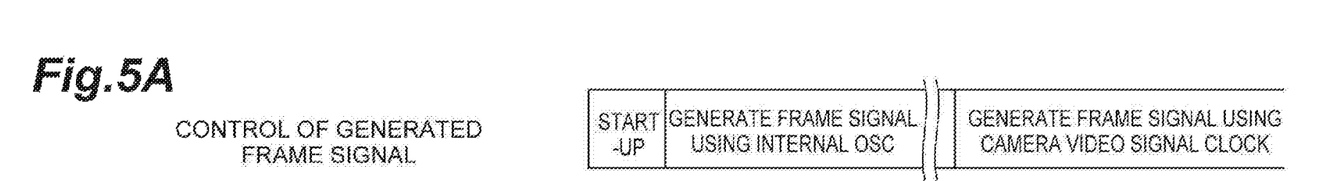
FIGS. 5A to 5F are timing charts describing an operation example of video signal receivers 11B and 11C at the time of start-up.
Figure 5B:
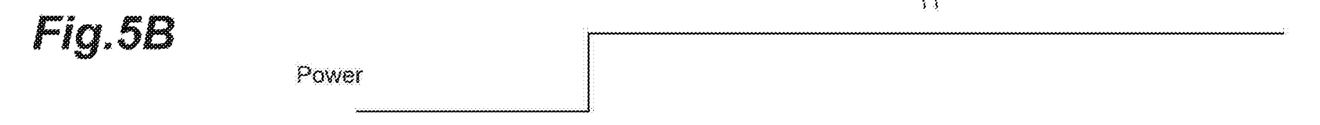
Figure 5C:
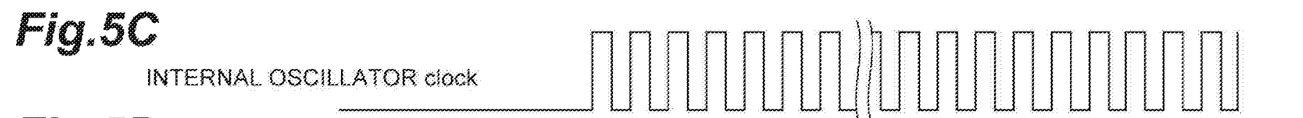
Figure 5D:
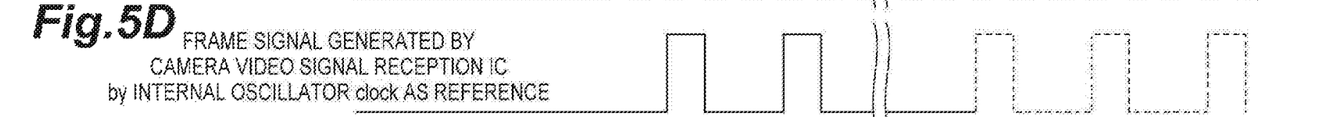
Figure 5E:
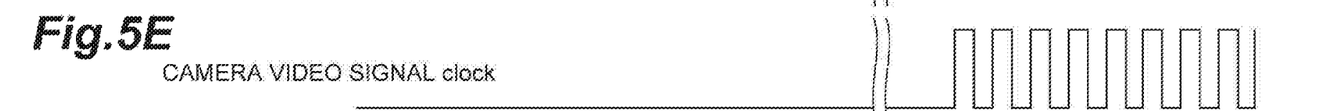
Figure 5F:
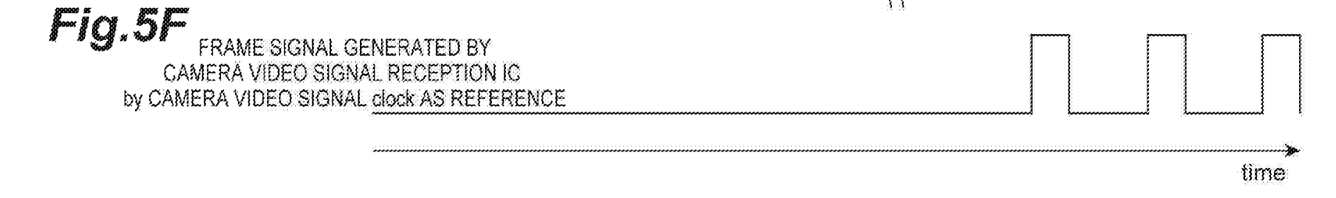
Figure 6A:
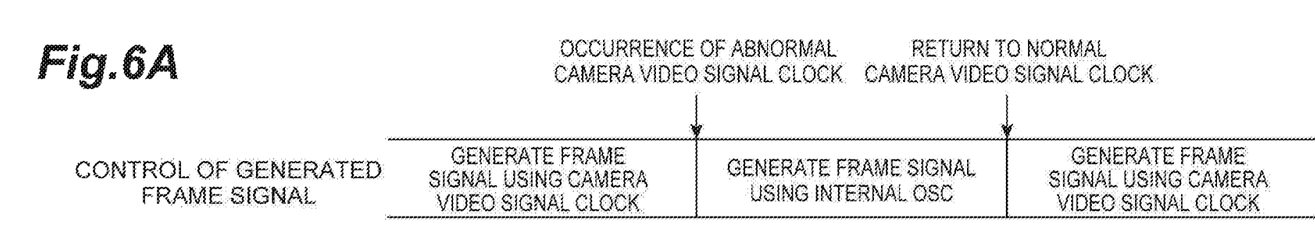
FIGS. 6A to 6F are timing charts describing an operation example of the video signal receivers 11B and 11C at the time of occurrence of an abnormal state and the time of return to a normal state.
Figure 6B:
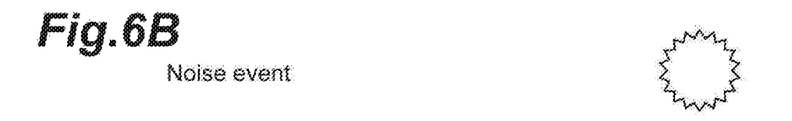
Figure 6C:
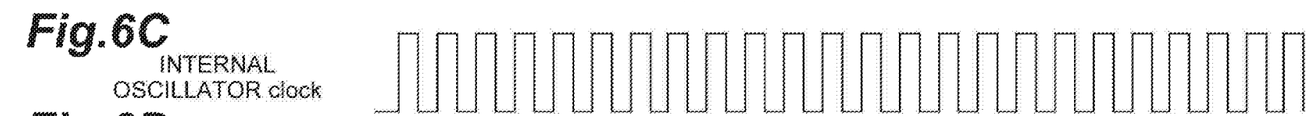
Figure 6D:
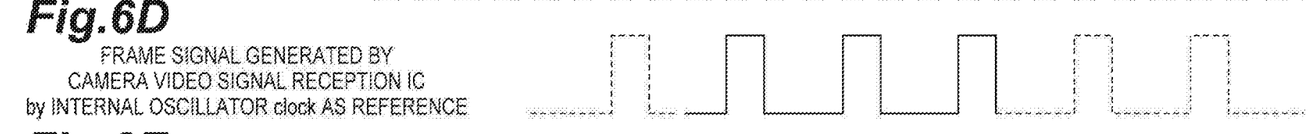
Figure 6E:
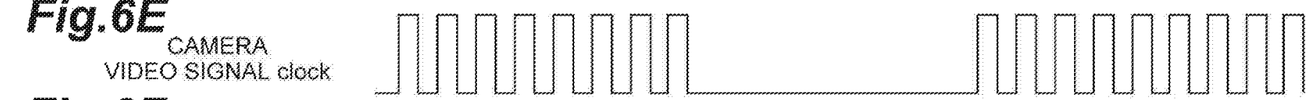
Figure 6F:
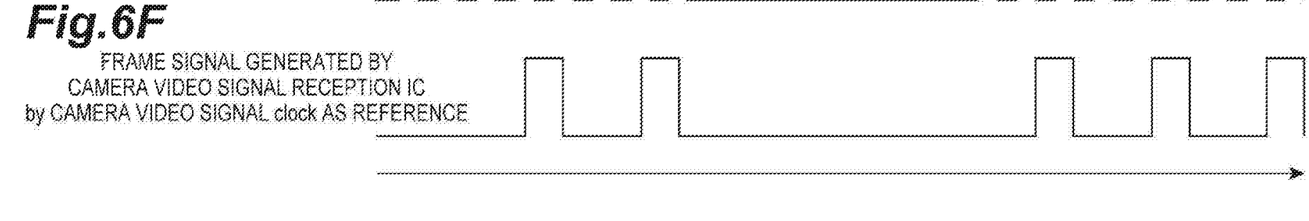

FIG. 4 is a diagram illustrating the third configuration example of the video signal receiver 11. FIG. 4 also illustrates a configuration related to the generation of the frame signal. A video signal receiver 11C of the third configuration example includes the clock signal receiver 110, a frame signal generator 120C, the frame signal transmitter 130, the internal oscillator 140, and the detection unit 150.

The video signal receiver 11C of the third configuration example illustrated in FIG. 4 is different from the video signal receiver 11B of the second configuration example illustrated in FIG. 3 in that the video signal receiver 11C includes the frame signal generator 120C instead of the frame signal generator 120B. The frame signal generator 120C performs the same input and output operations as the frame signal generator 120B but has a different internal configuration.

The frame signal generator 120C includes a clock selection unit 124 and a generator 125. In a case where the detection unit 150 detects normal reception of the clock by the clock signal receiver 110, the clock selection unit 124 selects the clock received by the clock signal receiver 110 and outputs the clock to the generator 125. In a case where the detection unit 150 detects abnormal reception of the clock by the clock signal receiver 110, the clock selection unit 124 selects the clock generated by the internal oscillator 140 and outputs the clock to the generator 125. The generator 125 generates the frame signal based on the clock output from the clock selection unit 124 and outputs the frame signal to the frame signal transmitter 130.

FIGS. 5A to 5F are timing charts describing an operation example of the video signal receivers 11B and 11C at the time of start-up. In order from top, FIGS. 5A to 5F illustrate (a) a state of control of frame signal generation, (b) an electric power supply state, (c) the waveform of the clock output from the internal oscillator 140, (d) the waveform of the frame signal created based on the clock output from the internal oscillator 140, (e) the waveform of the clock received by the clock signal receiver 110, and (f) the waveform of the frame signal created based on the clock received by the clock signal receiver 110.

In this operation example, for a certain period after start-up, the camera video signal clock is not sent from the video signal transmitter 21 in the camera module $20_1$, and thus, the detection unit 150 detects abnormal reception of the clock by the clock signal receiver 110. Depending on the detection result of the detection unit 150, the frame signal generators 120B and 120C output the frame signal based on the clock generated by the internal oscillator 140.

By doing so, while the accuracy of the clock cycle of the internal oscillator 140 is low, and the accuracy of the cycle of the frame signal is also low, the frame signal is sent to the video signal transmitter 21 of each camera module $20_n$ from the video signal receiver 11. The camera 22 starts the capturing operation in each camera module $20_n$ that 115 receives the frame signal. In a case where the capturing operation is started, the video signal receiver 11 can receive the camera video signal clock sent from the video signal transmitter 21 in the camera module $20_1$. The accuracy of the cycle of this clock is high.

Then, the detection unit 150 detects a change from abnormal to normal reception of the clock by the clock signal receiver 110. Depending on the detection result of the detection unit 150, the frame signal generators 120B and 120C output the frame signal generated based on the clock received by the clock signal receiver 110. The accuracy of the cycle of the subsequently generated frame signal is high.

For a certain period after start-up, the frame signal can be sent to the video signal transmitter 21 of each camera module $20_n$ from the video signal receiver 11 even in a case where the accuracy of the cycle is low. Eventually, the frame signal generated based on the clock of the high accuracy cycle input by the clock signal receiver 110 can be sent to the video signal transmitter 21 of each camera module $20_n$ from the video signal receiver 11.

FIGS. 6A to 6F are timing charts describing an operation example of the video signal receivers 11B and 11C at the time of occurrence of an abnormal state and the time of return to a normal state. In order from top, FIGS. 6A to 6F illustrate (a) the state of control of frame signal generation, (b) a noise occurrence timing, (c) the waveform of the clock output from the internal oscillator 140, (d) the waveform of the frame signal created based on the clock output from the internal oscillator 140, (e) the waveform of the clock received by the clock signal receiver 110, and (f) the waveform of the frame signal created based on the clock received by the clock signal receiver 110.

This operation example is an example of a case where the video signal transmission and reception system 1 is used in an industrial product, a vehicle-mounted product, and the like that have a high load and experience noise. Even in a case where the reception of the clock by the clock signal receiver 110 is in the normal state, the reception of the clock by the clock signal receiver 110 is changed to the abnormal state due to noise that occurs at a certain moment. Then, the frame signal is not supplied to each camera module $20_n$ from the video signal receiver 11, and the camera 22 in each camera module $20_n$ may not be able to continue the capturing operation.

In this operation example, the frame signal can be supplied to each camera module $20_n$ from the video signal receiver 11 even at the time of occurrence of the abnormal state and the time of return to the normal state afterward.

In a case where the reception of the clock by the clock signal receiver 110 is changed to the abnormal state from the normal state due to noise, the detection unit 150 detects the change. Depending on the detection result of the detection unit 150, the frame signal generators 120B and 120C output the frame signal generated based on the clock generated by the internal oscillator 140. By doing so, while the accuracy of the cycle of the flame signal is low, the frame signal is sent to the video signal transmitter 21 of each camera module $20_n$ from the video signal receiver 11. The camera 22 resumes the capturing operation in each camera module $20_n$ that receives the frame signal. In a case where the capturing operation is resumed, the video signal receiver 11 can receive the camera video signal clock sent from the video signal transmitter 21 in the camera module $20_1$.

Then, the detection unit 150 detects a change from abnormal to normal reception of the clock by the clock signal receiver 110. Depending on the detection result of the detection unit 150, the frame signal generators 120B and 120C again output the frame signal generated based on the clock received by the clock signal receiver 110. The accuracy of the cycle of the subsequently generated frame signal is high.

For a period in which the reception of the clock by the clock signal receiver 110 is in the abnormal state, the frame signal can be sent to the video signal transmitter 21 of each camera module $20_n$ from the video signal receiver 11 even in a case where the accuracy of the cycle is low. In a case where a return is made to the normal state, the frame signal generated based on the clock of the high accuracy cycle input by the clock signal receiver 110 can be sent to the video signal transmitter 21 of each camera module $20_n$ from the video signal receiver 11. Accordingly, even at any time of occurrence of the abnormal state and return to the normal state, the camera 22 can continue the capturing operation.

Next, a modification example will be described.

Figure 7:
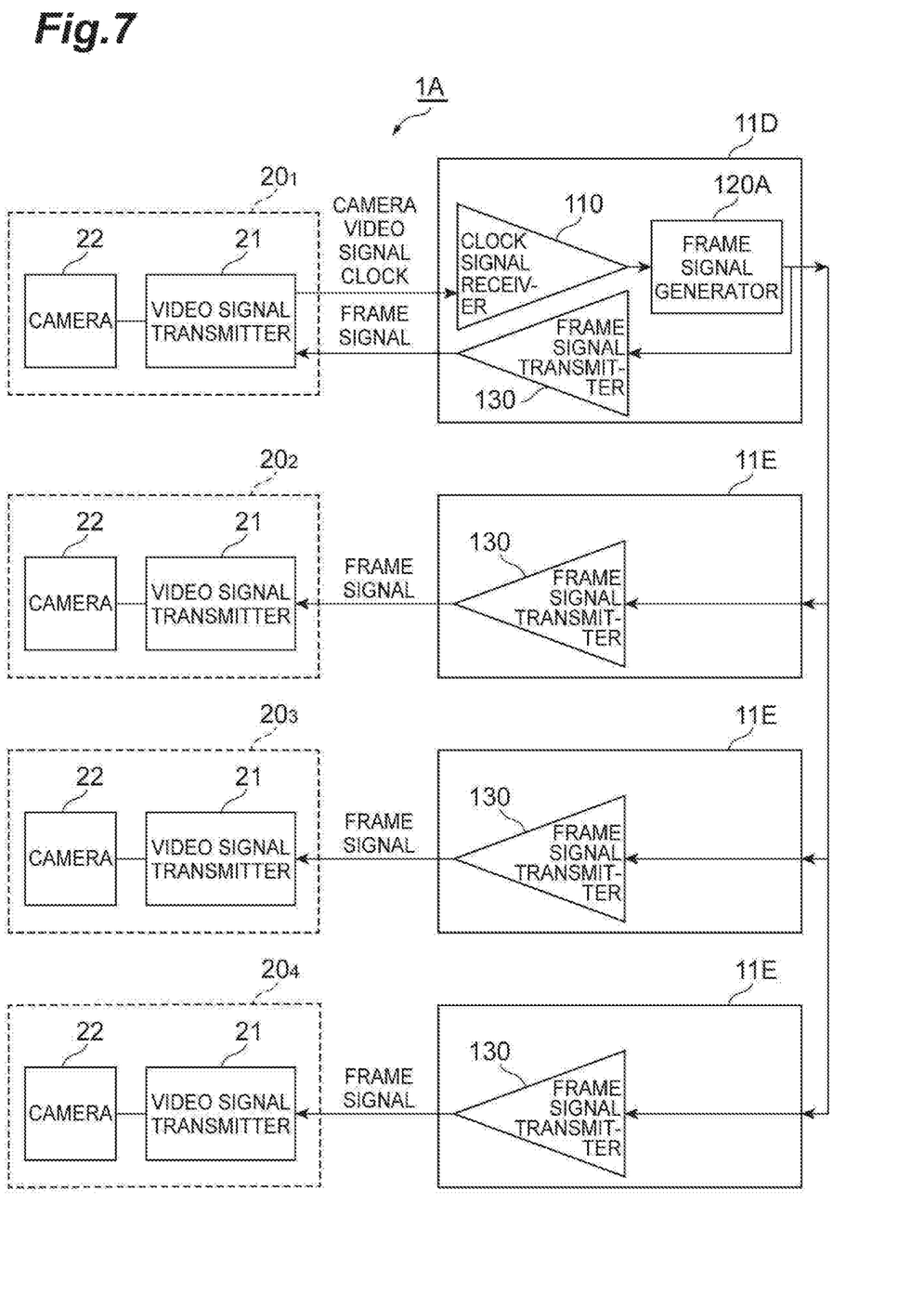
FIG. 7 is a diagram illustrating a configuration of a modification example of the video signal transmission and reception system 1.

FIG. 7 is a diagram illustrating a configuration of a modification example of the video signal transmission and reception system 1. A video signal transmission and reception system 1A of the modification example illustrated in FIG. 7 includes a video signal receiver 11D, one or a plurality of video signal receivers 11E, and a plurality of video signal transmitters 21. Each of the video signal receiver 11D and the video signal receivers 11E is connected to one video signal transmitter 21 through a signal line. The video signal receiver 11D receives the video signal clock sent from a video signal transmitter $21_1$ using the clock signal receiver 110, generates the frame signal based on the received clock using the frame signal generator 120A, and sends the frame signal to the video signal transmitter $21_1$ using the frame signal transmitter 130. The video signal receiver 11E receives input of the frame signal generated by the frame signal generator 120A of the video signal receiver 11D and sends the frame signal to the corresponding video signal transmitter 21 using the frame signal transmitter 130. In a case where a malfunction occurs at any location, such a configuration can prevent an increase in the range of the effect of the malfunction.

Figure 8:
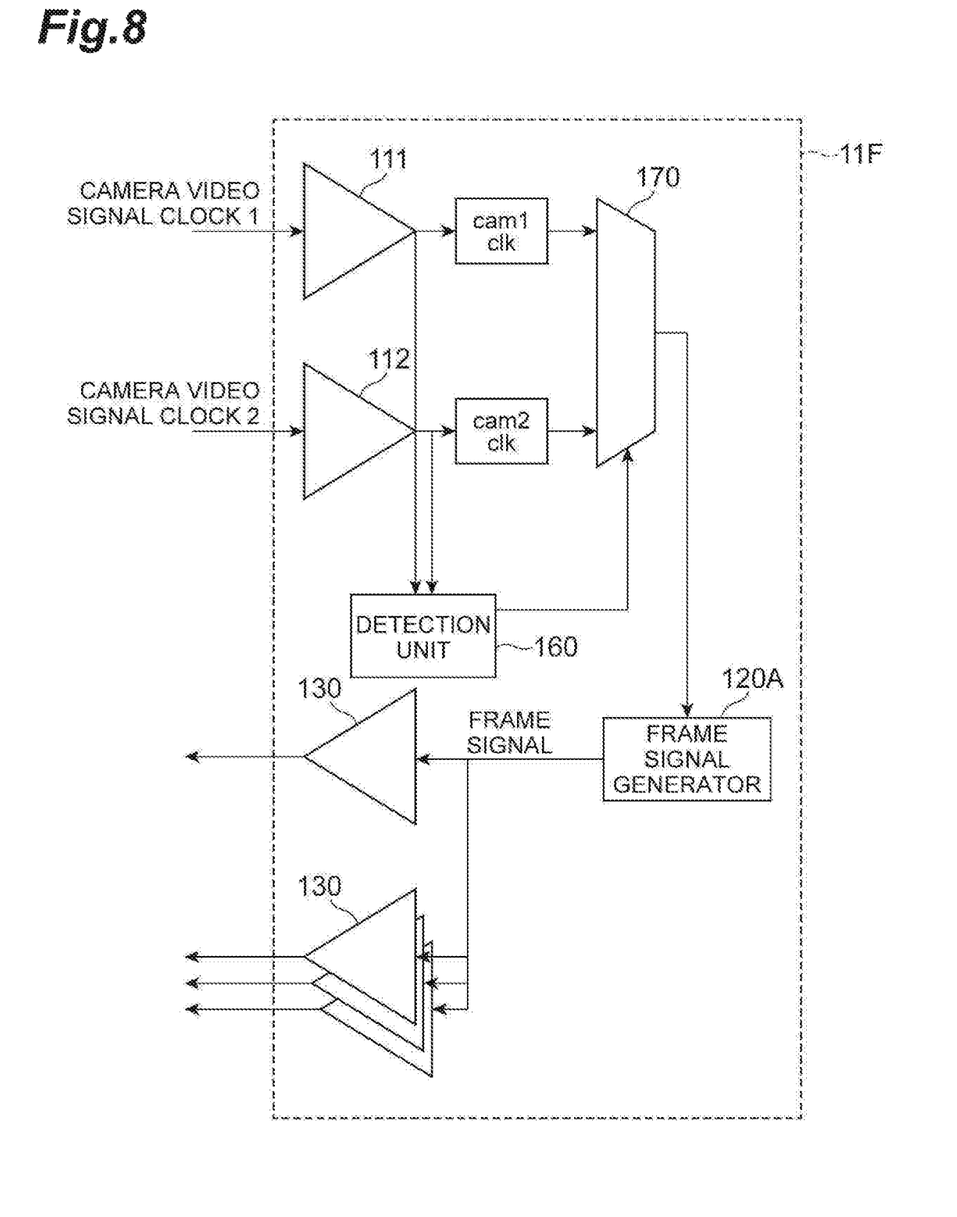
FIG. 8 is a diagram illustrating a configuration of a modification example of the video signal receiver 11.

FIG. 8 is a diagram illustrating a configuration of a modification example of the video signal receiver 11. In a video signal receiver 11F of the modification example illustrated in FIG. 8, a clock signal receiver 111 receives a video signal clock sent from a certain video signal transmitter 21. A clock signal receiver 112 receives a video signal clock sent from another video signal transmitter 21. A detection unit 160 detects whether or not reception of the clock by each of the clock signal receivers 111 and 112 is normal. In a case where the detection unit 160 detects normal reception of the clock by any clock signal receiver of the clock signal receivers 111 and 112, a selection unit 170 selects the clock received by the clock signal receiver for which the normal reception of the clock is detected, and outputs the clock to the frame signal generator 120A. The frame signal generator 120A generates and outputs the frame signal based on the clock output from the selection unit 170.

As described above, a video signal receiver includes a clock signal receiver that is connected to a clock output terminal of a video signal transmitter, a frame signal generator that is connected to an output terminal of the clock signal receiver, and a frame signal transmitter that is connected to an output terminal of the frame signal generator and is connected to an input terminal of the video signal transmitter. The central operation processor 12 (central processing unit (CPU)) includes a memory and can include a program that controls the above process. The memory can be disposed outside the central operation processor 12.

What is claimed is:

1. A video signal receiver connected through a signal line to a video signal transmitter that sends a video signal acquired by capturing by a camera, the video signal receiver receiving the video signal sent from the video signal transmitter, the video signal receiver comprising:
a clock signal receiver that receives a clock sent from the video signal transmitter;
a frame signal generator that generates and outputs a frame signal based on the clock received by the clock signal receiver; and
a frame signal transmitter that sends the frame signal output from the frame signal generator to the video signal transmitter,
wherein
the clock, received by the clock signal receiver of the video signal receiver connected through the signal line to the video signal transmitter, is a camera video signal clock of the video signal transmitter and the camera video signal clock is not from an external oscillator, and
the camera video signal clock and the video signal from the video signal transmitter are thereby received from a same source at a same time.

2. The video signal receiver according to claim 1, further comprising:
an internal oscillator that generates a clock; and
a detection unit that detects whether or not the reception of the clock by the clock signal receiver is normal,
wherein the frame signal generator outputs the frame signal generated based on the clock received by the clock signal receiver in a case where the detection unit detects normal reception of the clock by the clock signal receiver, and outputs the frame signal generated based on the clock generated by the internal oscillator in a case where the detection unit detects abnormal reception of the clock by the clock signal receiver.

3. The video signal receiver according to claim 2,
wherein the frame signal generator includes:
a first generator that generates the frame signal based on the clock received by the clock signal receiver,
a second generator that generates the frame signal based on the clock generated by the internal oscillator, and
a signal selection unit that selects and outputs the frame signal generated by the first generator in a case where the detection unit detects normal reception of the clock by the clock signal receiver, and selects and outputs the frame signal generated by the second generator in a case where the detection unit detects abnormal reception of the clock by the clock signal receiver.

4. The video signal receiver according to claim 2,
wherein the frame signal generator includes:
a clock selection unit that selects and outputs the clock received by the clock signal receiver in a case where the detection unit detects normal reception of the clock by the clock signal receiver, and selects and outputs the clock generated by the internal oscillator in a case where the detection unit detects abnormal reception of the clock by the clock signal receiver, and
a generator that generates and outputs the frame signal based on the clock output from the clock selection unit.

5. The video signal receiver according to claim 2,
wherein the frame signal generator:
outputs the frame signal generated based on the clock generated by the internal oscillator depending on a detection result of the detection unit indicating abnormal reception of the clock by the clock signal receiver at a time of start-up, and
outputs the frame signal generated based on the clock received by the clock signal receiver in a case where the detection unit subsequently detects a change from abnormal to normal reception of the clock by the clock signal receiver.

6. The video signal receiver according to claim 2,
wherein the frame signal generator:
outputs the frame signal generated based on the clock generated by the internal oscillator in a case where the detection unit detects a change from normal to abnormal reception of the clock by the clock signal receiver, and
outputs the frame signal generated based on the clock received by the clock signal receiver in a case where the detection unit detects a change from abnormal to normal reception of the clock by the clock signal receiver.

7. The video signal receiver according to claim 2,
wherein a plurality of the clock signal receivers are provided,
the video signal receiver further comprises:
a detection unit that detects whether or not reception of the clock by each of the plurality of clock signal receivers is normal, and
in a case where the detection unit detects normal reception of the clock by any clock signal receiver among the plurality of clock signal receivers, the frame signal generator outputs the frame signal generated based on the clock received by the clock signal receiver for which the normal reception of the clock is detected.

* * * * *

UNITED STATES PATENT AND TRADEMARK OFFICE
CERTIFICATE OF CORRECTION

| | | |
|---|---|---|
| PATENT NO. | : 11,825,224 B2 | |
| APPLICATION NO. | : 16/245493 | |
| DATED | : November 21, 2023 | |
| INVENTOR(S) | : Rei Fujiki and Daisuke Iwama | |

It is certified that error appears in the above-identified patent and that said Letters Patent is hereby corrected as shown below:

On the Title Page

Below item (21), insert the following:
--(30) Foreign Application Priority Data
January 12, 2018 (JP) ............. 2018-003293--

Signed and Sealed this
Eleventh Day of June, 2024

*Katherine Kelly Vidal*

Katherine Kelly Vidal
*Director of the United States Patent and Trademark Office*